United States Patent Office  3,173,837  
Patented Mar. 16, 1965

3,173,837  
PREPARATION AND USE OF 6-METHYL-16-METHYLENE-6-DEHYDRO-CORTICOIDS  
Fritz von Werder and Klaus Brückner, Darmstadt, Karl-Heinz Bork, Griesheim, near Darmstadt, and Harald Metz, Darmstadt, Germany, assignors to E. Merck Aktiengesellschaft, Darmstadt, Germany  
No Drawing. Filed Nov. 15, 1962, Ser. No. 238,015  
Claims priority, application Germany, Nov. 18, 1961, M 50,922, M 50,923; Nov. 25, 1961, M 50,991  
6 Claims. (Cl. 167—77)

This invention relates to the preparation and use of 6,7-unsaturated 6-methyl-16-methylene-3-keto-steroids, and the 1-dehydro derivatives thereof.

For many years, intensive efforts have been made toward the development of cortisone derivatives and analogs having high glucocorticoid activities, and which do not exhibit undesirable side effects. Pertinent to the present invention is the work of Mattox et al., J. Biol. Chem., 197, 261 (1952), wherein it was discovered that the introduction of an additional double bond at the 6,7-position resulted in about a 50% reduction of the original glucocorticoid activity. In view of the latter work, it was indeed surprising to find that the introduction of a 6,7 double bond in 6-methyl-16-methylene-3-keto-steroids is attended with increased corticoid activities—a result diametrically opposed to the prior art.

An object of this invention, therefore is to provide 6,7-unsaturated 6-methyl-16-methylene-3-keto steroids and the 1-dehydro derivatives thereof.

Another object is to provide a process for the preparation of the steroids of this invention, and to provide novel intermediates therefore.

Still another object is to provide pharmaceutical compositions based on the steroids of this invention.

An additional object is to provide a process for effecting corticoid activity in mamals by the administration of the steroids of this invention.

Still other objects and advantages of this invention will become apparent upon further study of the specification and appended claims.

The steroids of this invention conform to structural Formula I, as follows:

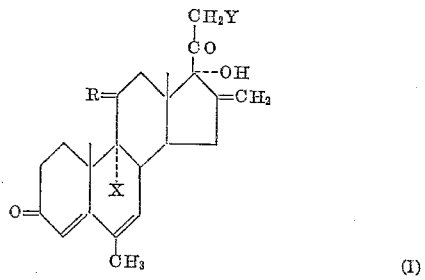

(I)

wherein R represents αH, βOH, or =O, X represents hydrogen or fluorine, and Y represents a free or esterified hydroxyl group; and the 1-dehydro derivatives thereof.

With respect to the esterified hydroxyl group, a wide variety of organic and inorganic acids can be employed. For this purpose reactive derivatives of saturated or unsaturated aliphatic or cycloaliphatic, aromatic or heterocyclic carboxylic acids are suitable, preferably of lower aliphatic, monocyclic cycloaliphatic, aromatic or heterocyclic carboxylic acids, lower mono-cyclic araliphatic or cycloaliphatic carboxylic acids, such as, for example, those of formic acid, the butyric acids, valeric acids or trimethylacetic acid, the caproic acids such as β-trimethyl-propionic acid, the enanthic, caprylic, pelargonic, capric or undecyclic acids, for example, undecylenic acid, the lauric, myristic, palmitic or stearic acids, for example oleic acid, cyclopentyl-, cyclohexyl- or phenyl-acetic acids or propionic acids, benzoic acid, phenoxyalkanic acids such as phenoxyacetic acid, p-chloro-phenoxyacetic acid, 2,4-dichlorophenoxyacetic acid, 4-tertiary butyl-phenoxyacetic acid, 3-phenoxypropionic acid, 4-phenoxy-butyric acid, furan-2-carboxylic acid, 5-tertiary butyl-furan-2-carboxylic acid, 5-bromo-furan-2-carboxylic acid, the nicotinic acids, or also of dicarboxylic acids, such as oxalic, succinic or glutaric acids, substituted carboxylic acids, such as β-keto-carboxylic acids, for example the acetoacetic, butyrylacetic or caproylacetic acid, or amino acids and so on. Additionally, inorganic acids such as phosphoric and sulfuric can be used. If the steroids are to be administered as pharmaceutical preparations, then it is, of course, important that physiologically compatible esters be used, such as those prepared with pharmaceutically acceptable acids, as for example, taken from the preceding group. Of the compounds embraced by Formula I, the following are exemplary:

6-methyl-16-methylene-6-dehydro-hydrocortisone  
6-methyl-16-methylene-6-dehydro-cortisone  
6-methyl-16-methylene-6-dehydro-prednisolone  
6-methyl-16-methylene-6-dehydro-prednisone  
6-methyl-9α-fluoro-16-methylene-6-dehydro-hydrocortisone  
6-methyl-9α-fluoro-16-methylene-6-dehydro-prednisolone as well as the 21-esters thereof, such as, for example, the acetates, propionates, tertiary butylacetates, hemisulfates, hemisuccinates, diethylamino acetates, and orthophosphates.

The steroids of this invention can be incorporated into medicinal preparations for use on mammals in connection with diseases treatable by other adrenocortical steroids such as cortisone and the like. The substances that are to be used as carriers should be such as are suitable for parenteral, peroral or topical use, as for example, water, vegetable oils, polyethylene glycol, gelatine, lactose, starch, magnesium stearate, talcum, petroleum jelly, cholesterol, etc. For parenteral application, preference should be given to solutions, suspensions or emulsions in oil or water, and also to implantations. For peroral application, use should be made of tablets or dragees, whereas for topical applications, use should be made of salves or cremes, preferably sterilized and mixed with preservatives, stabilizers, gelling agents, salts to control the osmotic pressure, or buffering agents.

If the end products of this invention are to be used in solid form, then the unit dosage should be between 0.3 and 5 mg. for mammals. If injected as solutions, the unit dosage should correspondingly be between 5 and 25 mg. In either form, the amount of carrier is not critical, but is preferably about 5 mg. to 2 g.

The steroids of this invention are produced by reacting a compound of Formula II

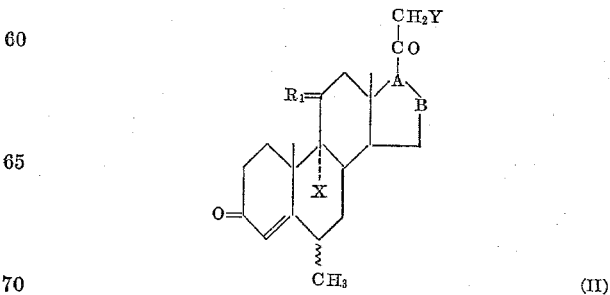

(II)

wherein X and Y and R have the same meaning as above, and R₁ represents H, H or R, and A—B represents

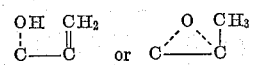

with chloranil, and, if $R_1$ represents hydrogen, subjecting it to the action of an 11-hydroxylating microorganism so as to introduce an 11-OH-group, and for the production of the corresponding 1-dehydro derivative reacting it with 2,3-dichloro-5,6-dicyano-p-benzo-quinone, or with microorganisms for removing hydrogens from the 1,2-position so as to leave a double bond therein.

Starting materials conforming to Formula II are produced from the compounds described in Belgian Patent 594,614 by a well known 21-acylation, for example, by subsequent treatment with an alkaline solution of iodine and potassium acetate. Starting materials containing an oxygen function in the 11-position and, if desired, also a fluorine atom in the 9α-position, may be prepared from those compounds according to standard procedures of steroid chemistry, for example, by microbiological hydroxylation of the 11-position and, if desired, subsequent dehydration, epoxidation of the thus obtained 9,11-dehydro compound and splitting of the 9β,11β-oxido ring formed thereby by treatment with hydrogen fluoride.

The starting materials of Formula II having a 16-methyl group and a 16α,17α-oxido ring are prepared by oxidation of 6,16-dimethyl-16α,17α-oxido-5-pregnene-3β-ol-20-one, a compound described as well in Belgian Patent 594,614. By this oxidation, the corresponding 3-keto-4-pregnene is formed, for example by the action of flavobacterium dehydrogenans or by an oxidation according to the well known method of Oppenauer.

The 6-dehydrogenation of a compound of Formula II with chloranil is preferably accomplished in the presence of an inert solvent such as, for example, benzene, toluene, xylene, chloroform, methylene chloride, acetone, methanol, ethanol, dioxane, ethyl acetate, tertiary butanol, tetrahydrofuran, or glacial acetic acid. The reaction is preferably conducted at above ambient temperatures, or, for instance, at the boiling temperature of the solvent. Chloranil is generally used in a molar ratio of 1 to 1, but an excess of chloranil is not detrimental. The reaction generally is completed in a few hours. If the starting material is a compound of Formula II, with a methyl group in the 16-position, and an oxido ring in the 16α,17α-position, then there will be found, surprisingly, not only a dehydrogenation in the 6-position, but also at the same time the oxido ring will be broken, with the formation of a 17α-hydroxyl and a 16-methylene group.

Preferably for this reaction there is used a substance of Formula II which has an esterified hydroxyl group in the Y-position. After completion of the 6-dehydrogenation, the resulting esters can be saponified to the 21-alcohols by standard methods, as for example, by treatment with an aqueous $NaHCO_3$, $Na_2CO_3$, or NaOH solution.

The introduction of a hydroxyl group into the 11-position of a steroid of the Formula II wherein R represents hydrogen is effected by usual microbiological methods. All microorganisms suitable for such reactions may be employed, for example, fungi of the genus Curvularia, Mucor, Stachylidium and Streptomyces (introducing a hydroxyl group at the 11β-position) or fungi of the genus Absidia, Cunninghamella, Fusarium, Mucor, Penicillium, Rhizopus (introducing a hydroxyl group at the 11α-position). The hydroxylation is effected according to standard procedures. The starting material is added to a culture of the microorganism which grows in a suitable nutrient solution at optimum temperature and with aeration. After 10 to 48 hours, the 11-hydroxy-steroid is isolated from the reaction mixture, preferably by extraction with a suitable organic solvent such as chloroform or methylene chloride.

The obtained 11-hydroxylated compounds may subsequently be oxidized to form the corresponding 11-keto steroids. For this oxidation, mild oxidizing agents are preferred. For example, chromic acid anhydride in glacial acetic acid or a mixture of chronic acid anhydride and pyridine or a mixture of sodium bichromate, sulfuric acid and acetone may be used. The 11-keto-steroids are isolated from the reaction mixture by extraction or by precipitation with water.

For the 1,2-dehydrogenation of steroids of Formula I, any of the appropriate microorganisms can be used for this purpose, such as the following species: Alternaria, Didymella, Calonectria, Colletotrichum, Cylindrocarpon, Fusarium, Ophiobolus, Septomyxa, Vermucularia, Acetobacter, Aerobacter, Alcaligenes, Bacillus (especially Bacillus sphaericus), Corynebacterium (especially Corynebacterium simplex), Erysipelothrix, Listeria, Micromonospora, Mycobacterium, Nocardia, Protaminobacter, Pseudomonas and Streptomyces. Fermentation requires about 4 to 40 hours, depending on which of the microorganisms is used. Especially suitable are cultures of Bacillus sphaericus var. fusiformis and Corynebacterium simplex. For dehydrogenation there is added a submerged culture of the selected organism to the starting material, which can be grown on a suitable nutrient material at optimum temperature and with strong aeration, according to the usual methods of fermentation technique. Instead of growing cultures, suspensions of the microorganisms in buffer solutions may be used with a technique that is otherwise the same. The reaction is followed by chromatographic observation and the fermented solution, after complete decomposition of the initial material, is extracted with chloroform.

According to this invention, the 1,2-dehydrogenation of a steroid of Formula I can also be accomplished in a chemical manner by treatment with 2,3-dichloro-5,6-dicyano-p-benzo-quinone. The reaction is preferably conducted using a solvent having a boiling point of 30–150° C. Suitable solvents are ethanol, butanol, tertiary butanol, tertiary-butyl acetic acid methyl ester, acetic acid butyl ester, dioxane, acetic acid, benzene, tetrahydrofuran, acetone, etc. It is, in addition, advantageous to add to the reaction mixture minor amounts of nitrobenzene. The reaction times may be from about 5 to 48 hours, depending on which solvent and which starting material is used. The reaction is preferably conducted at the boiling temperature of the solvent.

For the microbiological reactions the compounds of Formula I are generally used in the form of 21-alcohols, although sometimes also as 21 esters; whereas for dehydrogenating with 2,3-dichloro-5,6-dicyano-p-benzo-quinone, use is preferably made of the 21-ester.

Without further analysis, it is believed that one skilled in the art, can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(a) 10 g. 6α-methyl-16-methylene-4-pregnene-11β,17α,21-triol-3,20,dione-21-acetate are refluxed for 10 hours with 300 ml. ethylacetate, 30 ml. acetic acid and 7 g. chloranil. Upon cooling, the solution is poured into water and extracted with chloroform. The chloroform extract is washed subsequently with water, aqueous sodium hydroxide (1%) and again water and is dried with sodium sulfate. Upon evaporation, the 6-methyl-16-methylene-4,6-pregnadiene-11β,17α,21-triol-3,20-dione-21-acetate is crystallized from ethyl acetate. $\lambda_{max}$ 288 mμ, $\epsilon$=24,100; M.P. 194–195° C.; $(\alpha)_D^{24}$ +96° (dioxane).

The product thus obtained is saponified according to standard methods to yield 6-methyl-16-methylene-4,6-pregnadiene - 11β,17α,21 - triol - 3,20 - dione. $\lambda_{max}$ 289 mμ, $\epsilon$=24,700; M.P. 225–227° C.; $(\alpha)_D^{24}$ +72.3° (dioxane).

($b_1$) In a fermentation vessel, 15 l. of a nutrient solution containing 0.1% of yeast extract, pH 6.8, are inoculated with 1.5 l. of a culture of *Corynebacterium simplex*. The culture is grown with constant stirring and aeration at 28° C. After 4–8 hours, 7.5 g. 6-methyl-16-methylene-4,6-pregnadiene-11$\beta$,17$\alpha$,21-triol-3,20-dione in 300 ml. methanol are added. The dehydrogenation is controlled by paper chromatography and is usually finished after 10–14 hours. The solution is extracted three times with chloroform; the extracts are evaporated and the 6-methyl-16-methylene-1,4,6-pregnatriene-11$\beta$,17$\alpha$,21-triol-3,20-dione is recrystallized from acetone. $\lambda_{max}$ 227, 254, 304 m$\mu$, $\epsilon$=14,580, 9840, 11,940; M.P. 235–236° C.; $(\alpha)_D^{24}$ —6.6° (dioxane).

($b_2$) 3.5 g. 6-methyl-16-methylene-4,6-pregnadiene-11$\beta$,17$\alpha$,21-triol-3,20-dione-21-acetate and 3.5 g. 2,3-dichloro-5,6-dicyano-benzoquinone are dissolved in 70 ml. dioxane and refluxed for 6 hours. The mixture is diluted with chloroform and washed subsequently with 30 ml. of aqueous sodium hydroxide (1 N) and water. The solution is dried and evaporated. The 6-methyl-16-methylene-1,4,6-pregnatriene-11$\beta$,17$\alpha$-21-triol-3,20-dione-21-acetate is recrystallized from acetone/ether. $\lambda_{max}$ 227, 254, 304 m$\mu$, $\epsilon$=14,600, 9800, 12,000; M.P. 226–229° C.; $(\alpha)_D$ +21.3° (dioxane).

EXAMPLE 2

(a) 5 g. 6$\alpha$-methyl-16-methylene-4-pregnene-17$\alpha$,21-diol-3,11,20-trione-21-acetate are dissolved in 100 ml. methylethyl-ketone and refluxed for 7 hours with 7 g. chloranil. The reaction mixture is cooled, poured into water and extracted with chloroform. The extracts are washed subsequently with water, with 100 ml. aqueous sodium hydroxide (1%), and again with water and are dried with sodium sulfate. Upon evaporation, the 6-methyl-16-methylene-4,6-pregnadiene-17$\alpha$,21-diol-3,11,20-trione-21-acetate crystallizes from methanol. $\lambda_{max}$ 287.5 m$\mu$, $\epsilon$=23,800; M.P. 199–201° C.; $(\alpha)_D^{24}$ +197.3° (dioxane).

Saponification results in the formation of 6-methyl-16-methylene-4,6-pregnadiene-17$\alpha$,21-diol-3,11,20-trione. $\lambda_{max}$ 287.5 m$\mu$, $\epsilon$=24,200; $(\alpha)_D$ +155° (dioxane).

(b) In a fermentation vessel 15 l. of a nutrient solution containing 1% yeast extract, pH 6.8, are inoculated with 0.5 l. of a culture of *Bacillus sphaericus*. The culture is grown at 28° C. and after 10 hours 7.5 g. 6-methyl-16-methylene-4,6-pregnadiene-17$\alpha$,21-diol-3,11,20-trione-21-acetate in 300 ml. methanol are added. As soon as the paper chromatogram no longer shows any starting material, the culture is extracted three times with chloroform. The combined chloroform extracts are evaporated and the residue is recrystallized from acetone whereby the 6-methyl-16-methylene-1,4,6-pregnatriene-17$\alpha$,21-diol-3,11,20-trione is obtained. $\lambda_{max}$ 227, 254, 304 m$\mu$, $\epsilon$=13,400, 10,200, 10,800.

EXAMPLE 3

(a) 3 g. 6$\alpha$-methyl-9$\alpha$-fluoro-16-methylene-4-pregnene-11$\beta$,17$\alpha$,21-triol-3,20-dione-21-acetate are dissolved in 900 ml. tert. amyl alcohol and refluxed for 7 hours with 2 g. chloranil. The light brown solution is poured into water and extracted with chloroform. The combined chloroform extracts are washed subsequently with water, with 210 ml. sodium hydroxide (1/10 N) and again with water and then dried with sodium sulfate. The chloroform is evaporated and the 6-methyl-9$\alpha$-fluoro-16-methylene-4,6-pregnadiene-11$\beta$,17$\alpha$,21-triol-3,20-dione-21-acetate is recrystallized from acetone/ether. $\lambda_{max}$ 287 m$\mu$, $\epsilon$=22,800.

Upon saponification, the corresponding 21-alcohol is obtained. $\lambda_{max}$ 286.5 m$\mu$, $\epsilon$=22,900.

(b) According to the method described in Example 2b, the 6-methyl-9$\alpha$-fluoro-16-methylene-4,6-pregnadiene-11$\beta$,17$\alpha$,21-triol-3,20-dione is dehydrogenated by the action of *Bacillus phaericus* whereby 6-methyl-9$\alpha$-fluoro-16-methylene-1,4,6-pregnatriene-11$\beta$,17$\alpha$,21-triol-3,20-dione is obtained.

EXAMPLE 4

The solution of 2 g. 6,16$\beta$-dimethyl-16$\alpha$,17$\alpha$-oxido-4-pregnene-11$\beta$,21-diol-3,20-dione-21-acetate in 60 ml. tetrahydrofuran is refluxed for 12 hours with 1.58 g. of chloranil. The reaction mixture is diluted with water and extracted with chloroform. The combined chloroform extracts are washed with sodium hydroxide (2 N) and with water. Upon evaporation, the 6-methyl-16-methylene-4,6-pregnadiene-11$\beta$,17$\alpha$,21-triol-3,20-dione-21-acetate crystallizes with methanol. $\lambda_{max}$ 288 m$\mu$, $\epsilon$=24,100; M.P. 194–195° C.; $(\alpha)_D^{24}$+96° (dioxane).

EXAMPLE 5

(a) According to the method described in Example 1a, 8 g. 6-methyl-16-methylene-4-pregnene-17$\alpha$,21-diol-3,20-dione-21-acetate are dehydrogenated to form the corresponding 4,6-pregnadiene. $\lambda_{max}$ 287 m$\mu$, $\epsilon$=23,100.

($b_1$) In a fermentation vessel, 15 l. of a nutrient solution containing 5% malt extract, 1% saccharose, 0.2% $NaNO_3$, 0.1% $K_2HPO_4$, 0.05% $MgSO_4$, 0.05% KCl and 0.005% $FeSO_4$, pH 7.0 are inoculated with 800 ml. of a culture of *Curvularia lunata* (Wakker) Boedijn. After growth for 24 hours at 28° C., 5 g. 6-methyl-16-methylene-4,6-pregnadiene-17$\alpha$,21-diol-3,2-dione or the 21-acetate thereof in 40 ml. dimethyl-formamide are added. As soon as the paper chromatogram no longer shows any starting material, the culture is extracted three times with 10 l. of chloroform. The chloroform extracts are concentrated and filtered through silica gel. The eluate obtained with chloroform/ethyl acetate (1:3) contains 6-methyl-16-methylene-4,6-pregnadiene-11$\beta$,17$\alpha$,21-triol-3,20-dione. $\lambda_{max}$ 289 m$\mu$, $\epsilon$=24,700; M.P. 225–227° C.; $(\alpha)_D^{24}$ +72.3° (dioxane).

($b_2$) 10 l. of a nutrient solution in a fermentation vessel containing 3% saccharose, 1% malt extract, 0.1% yeast extract and 0.2% $NaNO_3$ are inoculated with a suspension of spores of *Metarrhizium anisopliae*. The microorganism grows at 28° C. After 30 hours, 5 g. 6-methyl-16-methylene-4,6-pregnadiene-17$\alpha$,21-diol-3,20-dione in 200 ml. methanol are added. After 20 hours, no starting material can be detected by thin layer chromatography. The culture is extracted three times with 8 l. chloroform. The combined extracts are concentrated. Upon evaporation of the solvent, the residue is recrystallized from ethyl acetate whereby the 6-methyl-16-methylene-4,6-pregnadiene-11$\alpha$,17$\alpha$,21-triol-3,20-dione is obtained. $\lambda_{max}$ 289 m$\mu$, $\epsilon$=25,000.

This product may be oxidized by standard procedures to form the corresponding 11-ketone.

EXAMPLE 6

(a) According to the method described in Example 2a, 6-methyl-16-methylene-4,6-pregnadiene-17$\alpha$,21-diol-3,11,20-trion-21-acetate is obtained from the corresponding 4-pregnene. M.P. 199–201° C.

(b) According to the method described in Example 1$b_2$, 4 g. of the compound obtained in Example 6a are dehydrogenated to form 6-methyl-16-methylene-1,4,6-pregnatriene-17$\alpha$,21-diol-3,11,20-trione-21-acetate. $\lambda_{max}$ 226.5; 250; 300 m$\mu$, $\epsilon$=13,500, 10,050, 10,700; $(\alpha)_D$ +149° (dioxane).

EXAMPLE 7

According to the method described in Example 1a, 4 g. 6$\alpha$-methyl-16-methylene-4-pregnene-11$\beta$,17$\alpha$,21-triol-3,20-dione-21-tert. butyl acetate are dehydrogenated to form the corresponding 4,6-pregnadiene. $\lambda_{max}$ 288 m$\mu$, $\epsilon$=24,900.

The following are preferred embodiments of pharmaceutical compositions of this invention.

(I) *Tablets*

Each tablet contains:

| | Mg. |
|---|---|
| 6-methyl-16-methylene-6-dehydroprednisolone | 5 |
| Lactose | 120 |
| Starch | 15 |
| Magnesium stearate | 2 |
| Talc | 10 |

(II) *Tablets*

Each tablet contains:

| | Mg. |
|---|---|
| 6-methyl-16-methylene-6-dehydroprednisone | 6 |
| Lactose | 80 |
| Corn starch | 10 |
| Talc | 10 |

(III) *Aqueous suspension*

Each ampoule contains:

| | |
|---|---|
| 6-methyl-9α-fluoro-16-methylene-6-dehydro-prednisolone | 10 |
| Sodium chloride | 7 |
| Carboxymethyl cellulose | 2 |
| Methyl ester of para-hydroxybenzoic acid | 0.65 |
| Propyl ester of para-hydroxybenzoic acid | 0.35 |
| Phenol | 3 |
| Water, ad. 1 ml. | |

(IV) *Ointment*

| | G. |
|---|---|
| 6-methyl-16-methylene-6-dehydroprednisolone | 0.5 |
| Wool wax alcohols | 6 |
| Yellow petroleum jelly | 20 |
| Solid paraffine | 15 |
| Viscous paraffine | 58 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What we claim is:

1. A method of effecting corticoid activity in mammals, which method comprises administering to said mammals 6-methyl-16-methylene-6-dehydro-hydrocortisone.

2. In a process of preparing 6-methyl-16-methylene steroids of the formula

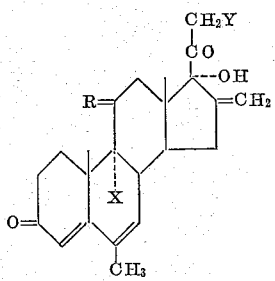

and the 1-dehydro derivatives thereof
wherein R is a member of the group consisting of α-H, β-OH and keto; X is a member of the group consisting of hydrogen and fluorine; and Y is a member of the group consisting of a free and esterified hydroxyl group;
the step which comprises reacting with chloranil a compound selected from the group consisting of compounds of the formula

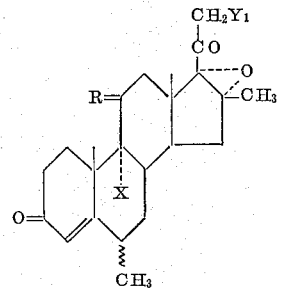

and the 1-dehydro derivatives thereof wherein X and R have the above significance and $Y_1$ is an esterified hydroxyl group.

3. A pharmaceutical composition in unit dosage form comprising 0.3 to 25 mg. of 6-methyl-16-methylene-6-dehydro-prednisolone and a pharmaceutically acceptable carrier.

4. A pharmaceutical composition in unit dosage form comprising 0.3 to 5 mg. of 6-methyl-16-methylene-6-dehydro-prednisolone and a peroral carrier.

5. A pharmaceutical composition in unit dosage form comprising 5 to 25 mg. of 6-methyl-16-methylene-6-dehydro-prednisolone and a parenteral carrier.

6. A method of effecting corticoid activity in mammals, which method comprises administering to said mammals 6-methyl-16-methylene-6-dehydro-prednisolone.

References Cited by the Examiner

UNITED STATES PATENTS

| 2,837,464 | 6/58 | Nobile | 260—397.4 |
| 2,902,483 | 9/59 | Agnello et al. | 260—397.45 |
| 3,067,194 | 12/62 | Tishler et al. | 260—397.45 |

LEWIS GOTTS, *Primary Examiner.*